United States Patent
Messing et al.

(10) Patent No.: US 11,891,110 B1
(45) Date of Patent: Feb. 6, 2024

(54) STEERING COLUMN WITH DUAL DIRECTION LOCK

(71) Applicant: STEERING SOLUTIONS IP HOLDING CORPORATION, Saginaw, MI (US)

(72) Inventors: Matthew L. Messing, Saginaw, MI (US); Jacob A. Caverly, Saginaw, MI (US); Margaret R. Szeliga, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/970,230

(22) Filed: Oct. 20, 2022

(51) Int. Cl.
  *B62D 1/184* (2006.01)
  *B62D 1/187* (2006.01)

(52) U.S. Cl.
  CPC ............. *B62D 1/184* (2013.01); *B62D 1/187* (2013.01)

(58) Field of Classification Search
  CPC ................................ B62D 1/184; B62D 1/187
  See application file for complete search history.

(56) References Cited

U.S. PATENT DOCUMENTS

| | | | |
|---|---|---|---|
| 9,764,757 B2* | 9/2017 | Buzzard | B62D 1/184 |
| 10,717,457 B2* | 7/2020 | Dubay | B62D 1/19 |
| 2006/0090586 A1* | 5/2006 | Lee | B62D 1/184 74/492 |
| 2008/0202276 A1* | 8/2008 | Harris | B62D 1/184 74/493 |
| 2014/0000325 A1* | 1/2014 | Buzzard | B62D 1/184 70/183 |
| 2014/0000405 A1* | 1/2014 | Anspaugh | B62D 1/184 74/493 |
| 2022/0227409 A1* | 7/2022 | Carl | B62D 1/187 |

FOREIGN PATENT DOCUMENTS

| | | | | |
|---|---|---|---|---|
| DE | 102015203541 B3 | * | 6/2016 | B62D 1/184 |
| EP | 3115278 A2 | * | 1/2017 | B62D 1/184 |
| WO | WO-2020240275 A1 | * | 12/2020 | B62D 1/184 |

\* cited by examiner

*Primary Examiner* — Drew J Brown
(74) *Attorney, Agent, or Firm* — Dickinson Wright PLLC

(57) ABSTRACT

A steering column has a tubular jacket supported by a mount bracket. The tubular jacket extends along a central axis between lower and upper ends, and is pivotal about a pivot axis. The mount bracket has first and second sidewalls spaced from one another for movement of the tubular jacket therebetween. The first and second sidewalls have first and second lock features, respectively. A lock bolt extends along a lock bolt axis transversely to the central axis. First and second lock cams are operably supported by the lock bolt for rotation about the lock bolt axis between locked and unlocked states. The first and second lock cams have respective first and second lock cam lock features for engagement with the first and second lock features, respectively, to releasably lock the tubular jacket against pivotal movement about the pivot axis in opposite first and second directions, respectively.

20 Claims, 7 Drawing Sheets

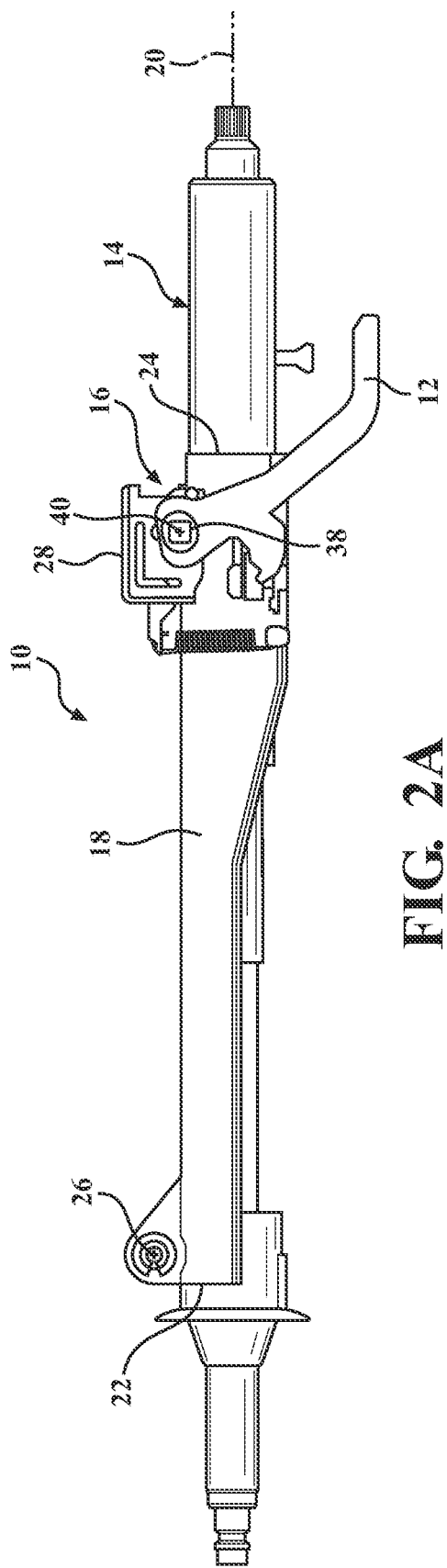
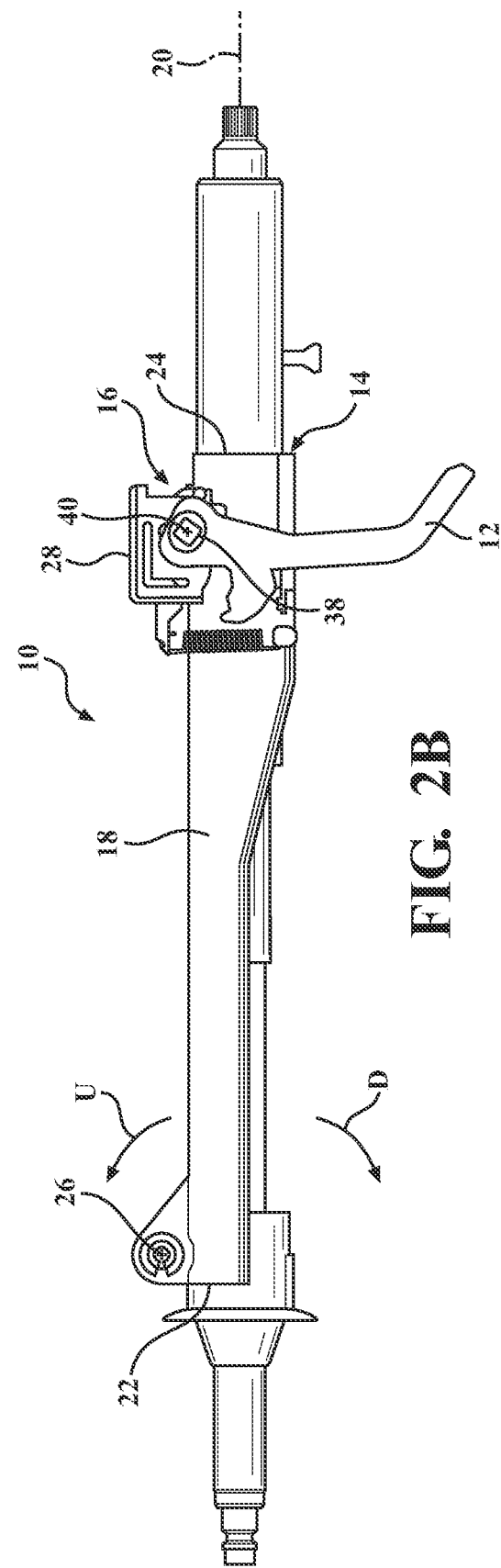

though these sources of friction can prove useful, it is desired to provide an increased locking force, particularly to prevent movement of the steering column jacket in a downward rake direction, to withstand an increased downward force applied to the steering jacket, such as when an operator is applying a downward force to a steering wheel, such as while getting into or out of the motor vehicle.

STEERING COLUMN WITH DUAL DIRECTION LOCK

FIELD OF THE INVENTION

The present disclosure generally relates to dual direction locks to inhibit relative tilting movement between a first member and a second member, and more specifically, to steering columns that are tiltable relative to a steering column axis of rotation and to lock mechanisms for releasably locking the steering column against inadvertent tilting movement.

BACKGROUND OF THE INVENTION

Adjustable steering columns are known to include a telescopically moveable mechanism that enables the steering column assembly to be telescopically adjusted along a steering column axis of rotation and/or a tiltable mechanism that enables the steering column to be vertically adjusted in a tilt, sometimes referred to as a "rake", direction, relative to the steering column axis of rotation about a tilt axis. A lock mechanism is typically provided to enable the tilt adjustment of the tiltable mechanism, when desired, and to lock the tiltable mechanism against inadvertent, unwanted tilt movement, when desired. The lock mechanism is known to include planar surfaces, e.g. a planar surface of a rake bracket and a planar surface of a steering column jacket, that are moveable away from one another to enable the tilt adjustment, while being moveable into clamped engagement with one another to provide a source of friction therebetween to lock the planar surfaces against rake movement relative to one another. Although this source of friction can prove useful, it is desired to provide an increased locking force, particularly to prevent movement of the steering column jacket in a downward rake direction, to withstand an increased downward force applied to the steering jacket, such as when an operator is applying a downward force to a steering wheel, such as while getting into or out of the motor vehicle.

SUMMARY OF THE INVENTION

The present disclosure provides a tiltable steering column including a tubular jacket extending along a central axis between a lower end and an upper end. The tubular jacket is pivotal about a jacket pivot axis, wherein the jacket pivot axis extends generally transversely to the central axis. The tiltable steering column includes a mount bracket having a first sidewall and an opposite second sidewall spaced from one another by a cavity sized for movement of a portion of the tubular jacket therebetween. The first sidewall has a plurality of first positive lock features and the second sidewall has a plurality of second positive lock features. A lock bolt extends along a lock bolt axis, wherein the lock bolt axis extends transversely to the central axis. A first lock cam and a second lock cam are operably supported by the lock bolt for rotation about the lock bolt axis between a locked state, in response to selective rotation of the lock bolt to a locked position, and an unlocked state, in response to selective rotation of the lock bolt to an unlocked position. The first lock cam has at least one first lock cam positive lock feature, and the second lock cam has at least one second lock cam positive lock feature. The at least one first lock cam positive lock feature is configured for engagement with the first positive lock features of the first sidewall when the first lock cam is in the locked state to releasably lock the tubular jacket against pivotal movement about the pivot axis in a first direction. The at least one second lock cam positive lock feature is configured for engagement with the second positive lock features of the second sidewall when the second lock cam is in the locked state to releasably lock the tubular jacket against pivotal movement about the pivot axis in a second direction opposite the first direction.

In accordance with another aspect of the disclosure, a dual direction lock to inhibit pivot movement of a first member relative to a second member is provided. The dual direction lock includes a mount bracket having a first sidewall and an opposite second sidewall. The first sidewall has a first lock feature and the second sidewall has a second lock feature. A lock bolt extends along a lock bolt axis, wherein a first lock cam and a second lock cam are operably supported by the lock bolt for rotation about the lock bolt axis between a locked state, in response to selective rotation of said lock bolt about the lock bolt axis to a locked position, and an unlocked state, in response to selective rotation of the lock bolt about the lock bolt axis to an unlocked position. The first lock cam has at least one first lock cam lock feature and the second lock cam has at least one second lock cam lock feature. The at least one first lock cam lock feature is configured for engagement with the first lock feature of the first sidewall when the first lock cam is in the locked state, and the at least one second lock cam lock feature is configured for engagement with the second lock feature of the second sidewall when the second lock cam is in the locked state.

In accordance with another aspect of the disclosure, a method of preventing inadvertent tilting of a tiltable steering jacket of steering column in opposite tilt directions is provided. The method includes supporting the tiltable steering jacket with a mount bracket having a first sidewall and a second sidewall spaced from the first sidewall, with the first sidewall having first positive lock features and the second sidewall having second positive lock features. Further, providing a first lock cam on a first side of the tiltable steering jacket, with the first lock cam being moveable from an unlocked state, whereat the first lock cam is moved out of blocking engagement with the first positive lock features of the first sidewall to permit tilting movement of the tiltable steering jacket in opposite first and second directions, to a locked state, whereat the first lock cam is moved into blocking engagement with the first positive lock features of the first sidewall to prevent tilting movement in the first direction. Further yet, providing a second lock cam on a second side, opposite the first side, of the tiltable steering jacket, with the second lock cam being moveable from an unlocked state, whereat the second lock cam is moved out of blocking engagement with the second positive lock features of the second sidewall to permit tilting movement of the tiltable steering jacket in the opposite first and second directions, to a locked state, whereat the second lock cam is moved into blocking engagement with the second positive lock features of the second sidewall to prevent tilting movement in the second direction.

These and other features will become readily apparent to one possessing ordinary skill in the art in view of the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2A is a side view of the tiltable steering column assembly illustrating a steering column lock arm while in a lock position;

FIG. 2B is a view similar to FIG. 2A illustrating the steering column lock arm while in an unlock position;

DETAILED DESCRIPTION

Figure 1:
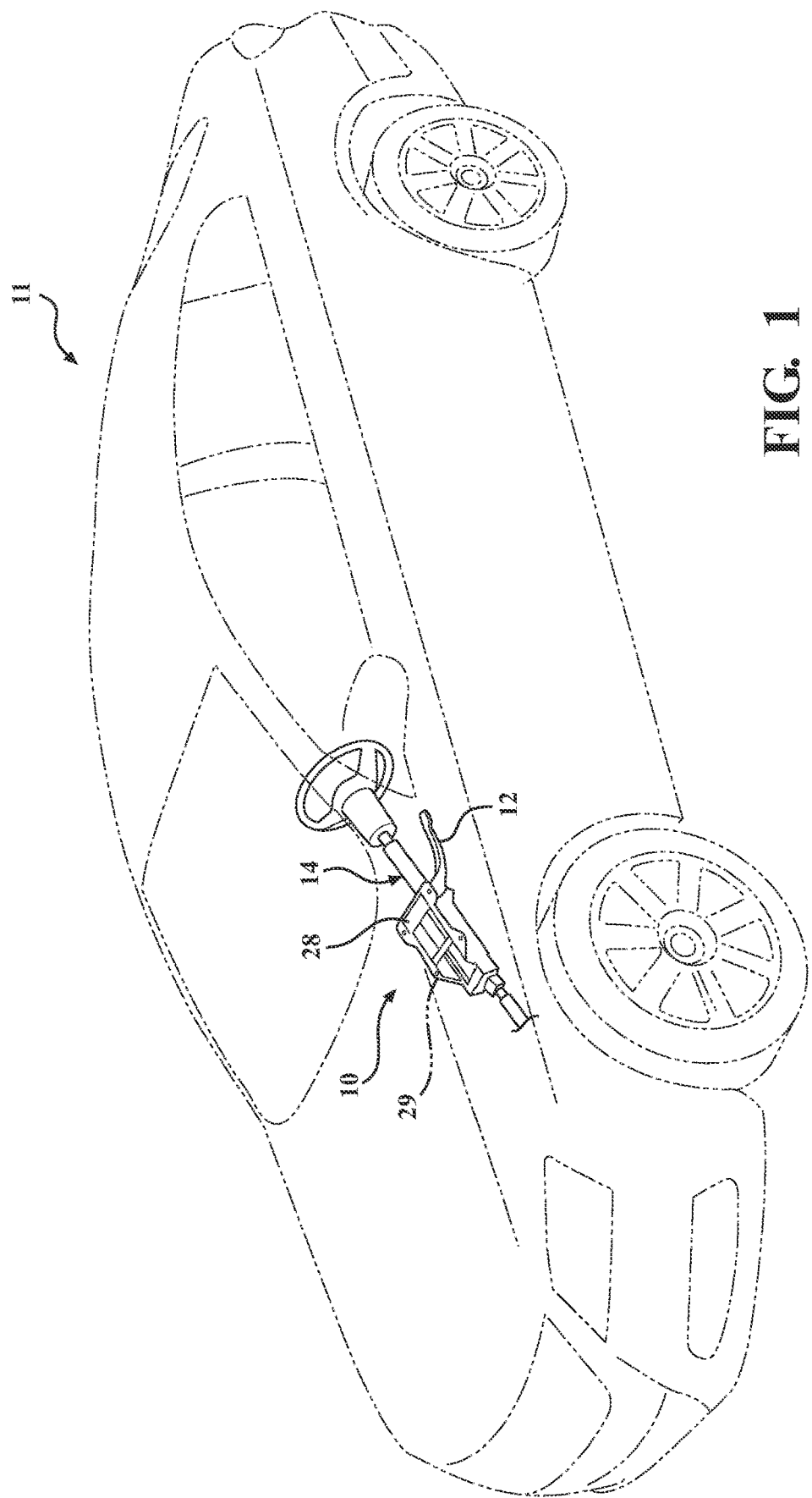
FIG. 1 illustrates a motor vehicle with a tiltable steering column assembly constructed in accordance with an aspect of the disclosure.

Referring now to the Figures, where the invention will be described with reference to specific embodiments, without limiting same, FIG. 1 illustrates an exemplary dual direction lock, and in an exemplary embodiment, a steering column assembly 10 therewith, by way of example and without limitation. As shown in FIG. 1, an exemplary tiltable steering column assembly 10 of a motor vehicle 11 comprises a steering column lock arm 12 for selectively resisting or facilitating raking (tilting) movement of a first member, shown as a tiltable steering column, referred to hereafter as steering column 14, by way of example and without limitation, within an adjustment range defined by a position lock 16. When the steering column lock arm 12 is positioned in a lock position, so as to place the position lock 16 in a locking mode, the steering column 14 is inhibited from being tiltably adjusted upwardly (arrow U in FIG. 2B) and downwardly (arrow D in FIG. 2B). Accordingly, the steering column 14 is relatively fixed, positionally, with respect to the vehicle 11 when the position lock 16 is in the locking mode. When the steering column lock arm 12 is positioned in an unlock position, so as to place the position lock 16 in an adjustment mode, rake, (also known as tilt) adjustments to the positioning of the steering column 14 are facilitated upwardly and downwardly, as desired by a vehicle driver. Accordingly, the steering column 14 may be positionally adjusted relative to the vehicle 11. Once the steering column 14 is selectively tilted to a desirable position, the steering column lock arm 12 may be re-positioned in a lock position by the vehicle driver, thereby returning the position lock 16 to the locking mode, whereat the steering column 16 is fixed against tilting movement in the upward and downward directions.

The steering column 14 has a tubular jacket 18 that extends lengthwise along a central axis 20 between a lower end 22 and an upper end 24. The tubular jacket 18 is selectively pivotal (selectively is intended to mean "when desired, and when actively performed by a vehicle occupant by moving the steering column lock arm 12 from the lock position (FIG. 2A) to the unlock position (FIG. 2B) when intended to move the steering column 14 upwardly (arrow U) or downwardly (arrow D), and then returning the steering column lock arm 12 to the lock position to releasably lock the steering column 14 against unwanted movement) about a jacket pivot axis 26. The pivot axis 26 is proximate the lower end 22 of the tubular jacket 18, shown as being immediately adjacent the lower end 22, wherein the jacket pivot axis 26 extends generally transversely to central axis 20 of the tubular jacket 18.

The steering column assembly 10 includes a rake lock bracket, also referred to as rake mount bracket or mount bracket 28. Mount bracket 28 is fixed to an immovable second member, such as a vehicle body member 29 of motor vehicle 11, by way of example and without limitation, and is operably coupled to the first member, tubular jacket 18, for selective relative movement therewith when the steering column lock arm 12 is in the unlock position. Mount bracket 28 has a first sidewall 30 and an opposite second sidewall 32 spaced from one another by a cavity C sized for movement of a portion of the tubular jacket 18 therebetween. The first sidewall 30 has a plurality of first positive lock features fixed thereto, shown as a plurality first positive lock teeth, referred to hereafter as first sidewall teeth 34, having peaks P and valleys V. The second sidewall 32 has a plurality of second positive lock features fixed thereto, shown as a plurality second positive lock teeth, referred to hereafter as second sidewall teeth 36, having peaks P and valleys V.

The steering column lock arm 12 of steering column assembly 10 includes a lock bolt 38 extending along, and rotatable a lock bolt axis 40. The lock bolt axis 40 extends transversely to the central axis 20.

Figure 3A:
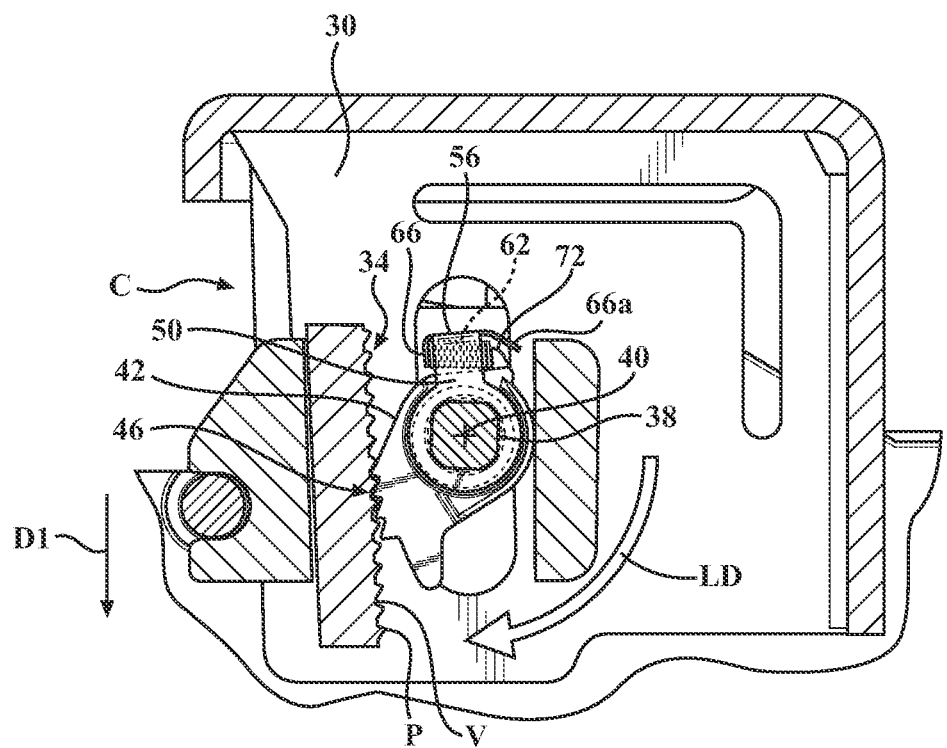
FIG. 3A is a partial cross-sectional view of a position lock of the steering column assembly illustrating a first lock cam while in a locked state.
Figure 3B:
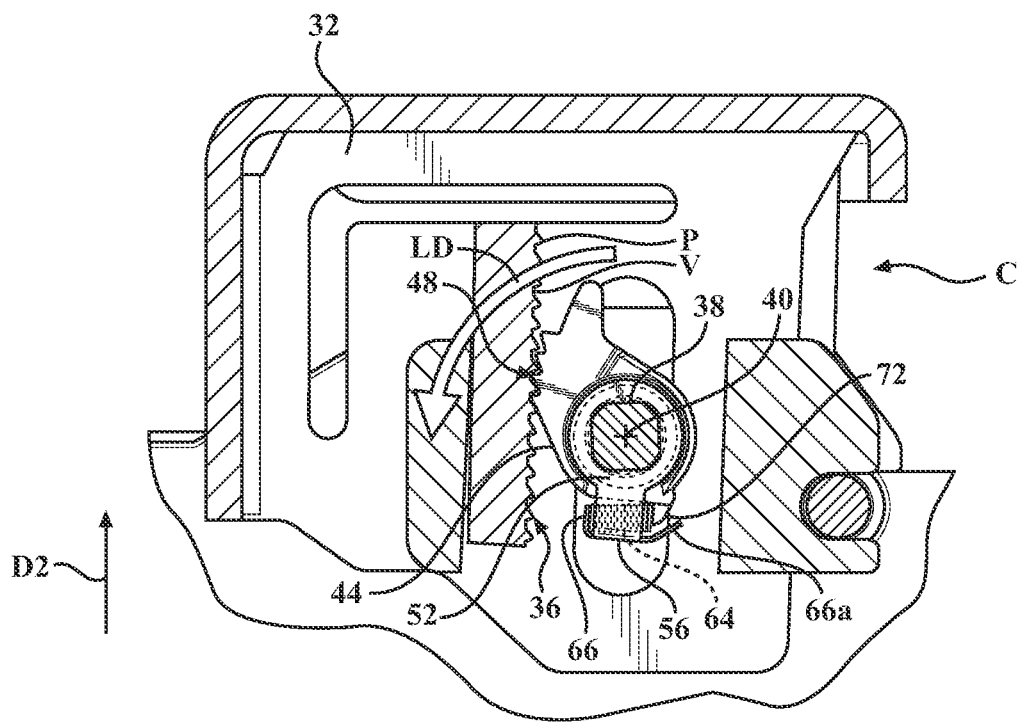
FIG. 3B is a view similar to FIG. 3A illustrating a second lock cam while in a locked state.
Figure 4A:
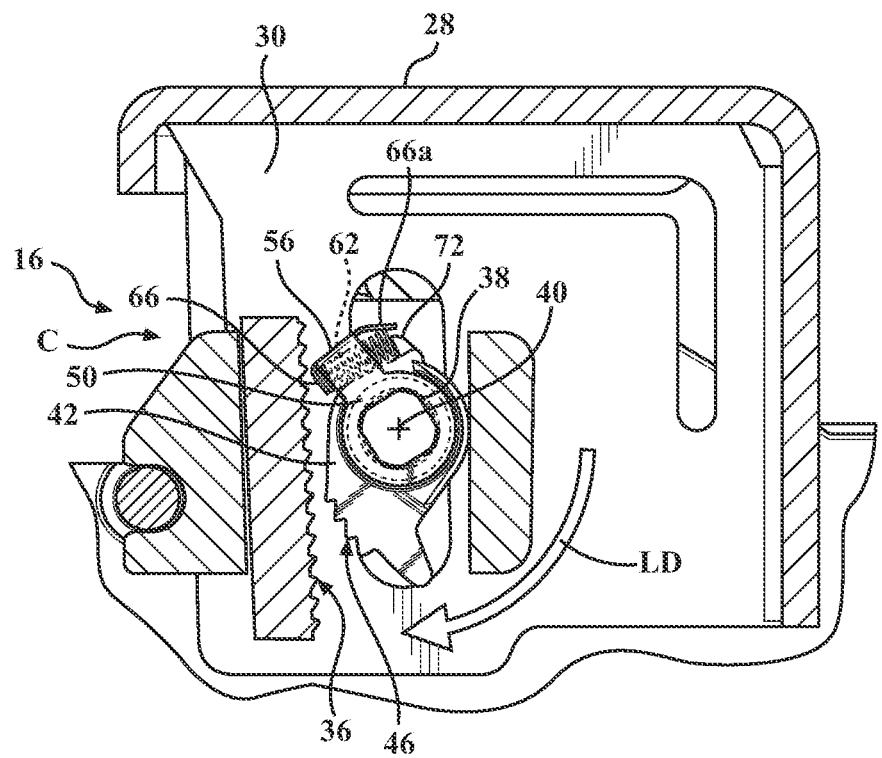
FIG. 4A is a view similar to FIG. 3A illustrating the first lock cam while in an unlocked state.
Figure 4B:
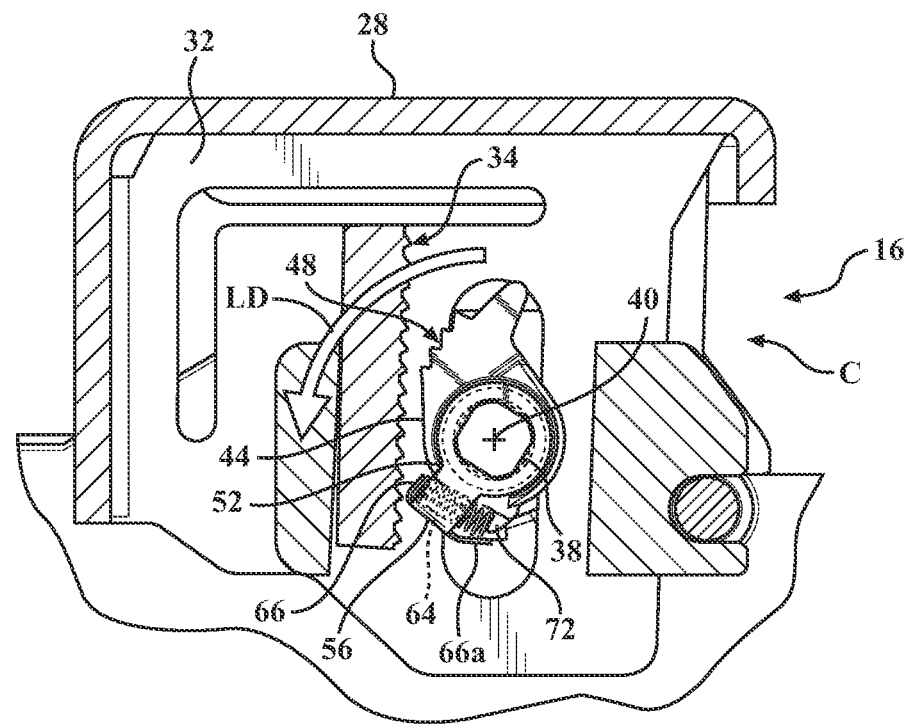
FIG. 4B is a view similar to FIG. 3B illustrating the second lock cam while in an unlocked state.
Figure 5:
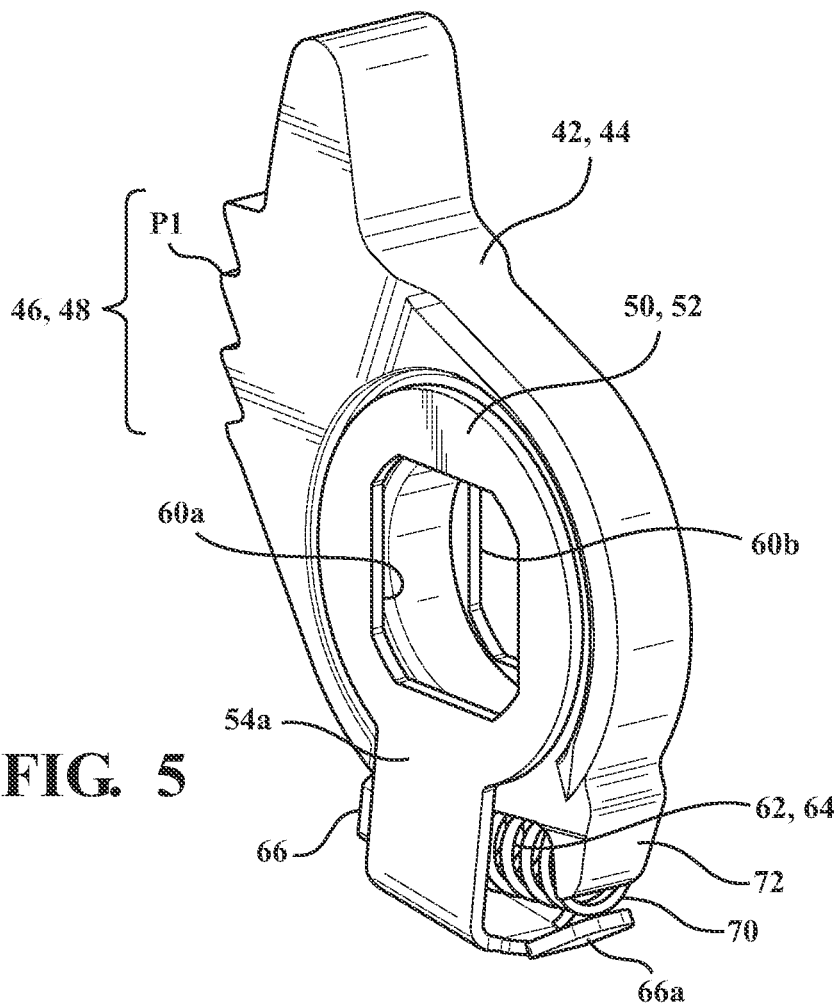
FIG. 5 is a perspective view of a lock cam and drive member assembly constructed in accordance with an aspect of the disclosure.
Figure 6:
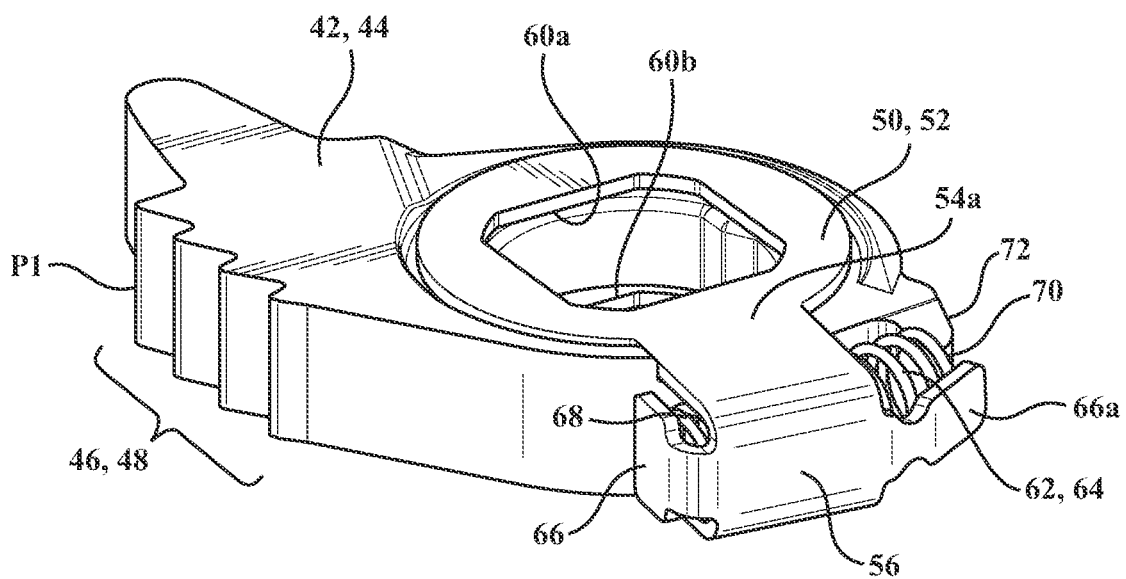
FIG. 6 is another perspective view of the lock cam and drive member assembly of FIG. 5.

The steering column assembly 10 and dual direction lock, also referred to as position lock 16, have a first tooth lock, also referred to as first lock cam 42, and a second tooth lock, also referred to as second lock cam 44. The first lock cam 42 and the second lock cam 44 are operably supported by the lock bolt 38 for rotation about the lock bolt axis 40 between a locked state, in response to selective rotation of the lock bolt 38 about the lock bolt axis 40 to a locked position, corresponding with the lock position of the steering column lock arm 12, and an unlocked state, corresponding with the unlock position of the steering column lock arm 12, in response to selective rotation of the lock bolt 38 about the lock bolt axis 40 to an unlocked position. The first lock cam 42 has at least one first lock cam positive lock feature, shown as a plurality of first lock cam positive lock features, referred to as first lock cam teeth 46. The second lock cam 44 has at least one second lock cam positive lock feature, shown as a plurality of second lock cam positive lock features, referred to as second lock cam teeth 48. The first lock cam teeth 46 are configured for obstructing (positive blocking; confronting) engagement with the first sidewall teeth 34 of the first sidewall 30 when the first lock cam 42 is in the locked state to releasably lock the tubular jacket 18 against pivotal movement about the jacket pivot axis 26 in a first direction D1 (one of upwardly U or downwardly D), wherein the first direction D1 is shown in FIG. 3A as the downward D tilt direction. The second lock cam teeth 48 are configured for obstructing (positive blocking; confronting) engagement with the second sidewall teeth 36 of the second sidewall 32 when the second lock cam 44 is in the locked state to releasably lock the tubular jacket 18 against pivotal movement about the jacket pivot axis 26 in a second direction D2 (one of upwardly U or downwardly D) opposite the first direction D1, wherein the second direction D2 is shown in FIG. 3B as the upward U tilt direction. The first lock cam 42 and the second lock cam 44 are similar in shape with one another, but face opposite directions from one another on opposite sides of the mount bracket 28, thereby resulting in one acting to prevent upward tilting movement of the steering column 14 and the other acting to prevent downward movement of the steering column 14, as discussed. Accordingly, the first lock cam 42 acts to releasably lock the tubular jacket 18, and ultimately the steering column 14, against pivotal movement about the jacket pivot axis 26 in one of an upwardly or downwardly direction when in the locked state, and shown as the first direction D1 downwardly, while the second lock cam 44 acts to releasably lock the tubular jacket 18, and ultimately the steering column 14, against pivotal movement about the jacket pivot axis 26 in the other of an upwardly or downwardly direction, opposite from the first lock cam 42, when in the locked state, and shown as the second direction D2 upwardly. As discussed further below, the first and second lock cams 42, 44 move about the lock bolt axis 40 in a lost-motion relation relative to the lock bolt 38 when moving to the locked state (FIGS. 3A and 3B), and the first and second lock cams 42, 44 are driven to move about the lock bolt axis 40, opposite a lock direction indicated by arrows LD, conjointly with the lock bolt 38 when moving to the unlocked state (FIGS. 4A and 4B).

The steering column assembly 10 and position lock 16 thereof further include a first drive member 50 and a second drive member 52 fixed for conjoint rotation with the lock bolt 38 in opposite directions of rotation of the lock bolt 38 between the locked and unlocked positions. Accordingly, if the lock bolt 38 is rotated, the first drive member 50 and the second drive member 52 are rotated in fixed, conjoint fashion therewith, and thus, with one another. The first drive member 50 is configured to operably drive the first lock cam 42 between the unlocked and locked states in response to rotation of the lock bolt 38 about the lock bolt axis 40 between the unlocked and locked positions, respectively. The second drive member 52 is configured to operably drive the second lock cam 44 between the unlocked and locked states in response to rotation of the lock bolt 38 about the lock bolt axis 40 between the unlocked and locked positions, respectively. The first lock cam 42 and the second lock cam 44 are configured to be simultaneously driven from their respective unlocked state to the locked state in response to rotation of the lock bolt 38 about the lock bolt axis 40 in the lock direction to the locked position. The first lock cam 42 and the second lock cam 44 are configured to be simultaneously driven from their respective locked state to the unlocked state in response to rotation of the lock bolt 38 about the lock bolt axis 40 in the unlock direction to the unlocked position.

Figure 7:
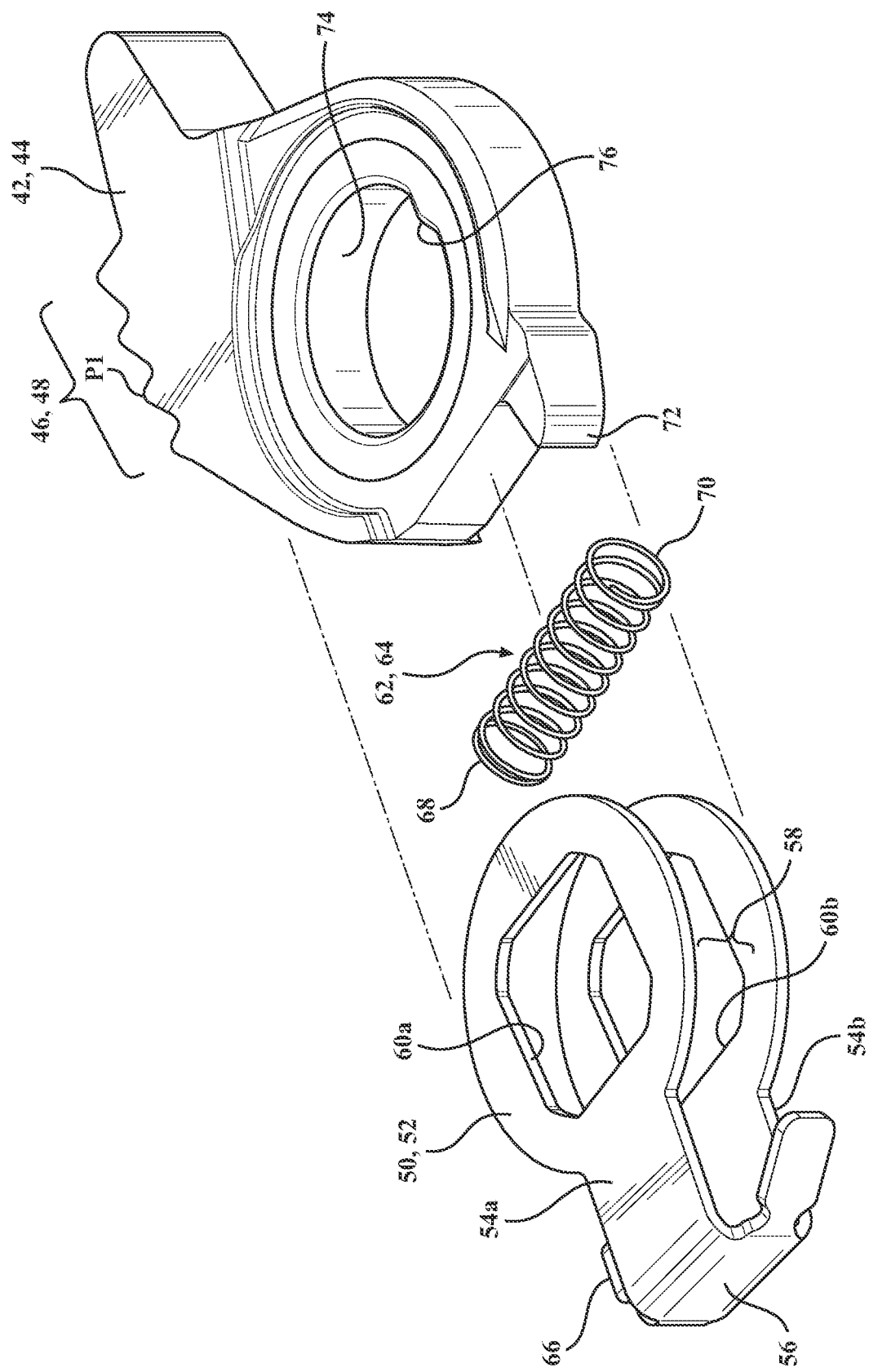
FIG. 7 is an exploded view of the lock cam and drive member assembly of FIGS. 5 and 6.

In the non-limiting illustrated embodiment, the first drive member 50 and the second drive member 52 are constructed similarly to one another, and thus, the following description of the structure of the first drive member 50 applies to the second drive member 52, and thus, the same reference numerals are used to designate similar features for both. The first drive member 50, as best seen in FIG. 7, has opposite sidewalls 54a, 54b interconnected with one another by a sidewall, referred to hereafter as retention wall 56. The sidewalls 54a, 54b extend generally parallel to one another and are spaced from one another by a gap 58 sized for a slightly loose-fit receipt of the first lock cam 42 therebetween. Accordingly, the gap 58 allows for relative rotation of the first drive member 50 relative to the first lock cam 42. The sidewalls 54a, 54b each have a respective through opening 60a, 60b sized for receipt of the lock bolt 38 therethrough. At least one, and shown as both through openings 60a, 60b, by way of example and without limitation, have non-circular peripheries, shown as having generally squared, flat edges FE with rounded corners RC extending between adjacent flat edges FE, by way of example and without limitation, wherein the portion(s) of the lock bolt 38 received therein has a generally similar shape sized for a close fit therein, such as line-to-line, slight interference, or slightly loose, such that when the lock bolt 38 is rotated, the lock bolt 38 drives the first lock cam 42 for conjoint rotation therewith. It is to be recognized that any non-circular shaped can be used to cause such driving relation between the lock bolt 38 and the first lock cam 42.

The first drive member 50 houses a first biasing member 62 and the second drive member 52 houses a second biasing member 64, with the retention wall 56 of each providing a portion of a retaining mechanism used to retain the first and second biasing members 62, 64 in disposed relation between the first drive member 50 and the first lock cam 42, and between the second drive member 52 and the second lock cam 44, respectively. The first and second biasing members 62, 64 can be provided as spring members, such as coil springs, by way of example and without limitation. The first and second drive members 50, 52 further including a biasing member stop surface, also referred to as retainer stop surface or retainer wall 66, forming a portion of the retaining mechanism. The retainer wall 66 extends from the retention wall 56 in inclined relation therefrom, shown as being generally transverse thereto, wherein the retainer wall 66 confronts and engages a first end 68 of the first and second biasing members 62, 64, with a second end 70 of the first and second biasing members 62, 64 being arranged in engagement with an abutment 72 of the first and second lock cams 42, 44. To facilitate maintaining the second end 70 of the first and second biasing members 62, 64 in aligned engagement with the abutment 72 of the first and second lock cams 42, 44, the first and second drive members 50, 52 can further include a secondary retainer wall 66a extending from an opposite end of the retention wall 56 from the retainer wall 66, with the secondary retention wall 66a being inclined from the retention wall 56 to guide and/or maintain the first and second biasing members 62, 64 in aligned engagement with the respective abutment 72. The first biasing member 62 imparts a bias force on the first lock cam 42 to move the first lock cam 42 to the locked state in response to rotation of the lock bolt 38 about the lock bolt axis 40 in the lock direction to the locked position. The second biasing member 64 imparts a bias force on the second lock cam 44 to move the second lock cam 44 to the locked state in response to rotation of the lock bolt 38 about the lock bolt axis 40 in the lock direction to the locked position.

In further detail, during movement of the steering column lock arm 12 from the unlock position to the lock position, the first drive member 50 is driven conjointly and concurrently with the lock bolt 38, wherein the retainer wall 66 of the first drive member 50 compresses the first biasing member 62 to impart a bias force with the first biasing member 62 on the abutment surface 72 of the first lock cam 42 to drive and releasably maintain the first lock cam 42 in the locked state. Accordingly, as the first biasing member 62 is compressed, the first lock cam 42 is rotated about the lock bolt axis relative to the lock bolt 38 to the locked state. With the steering column lock arm 12 retained in the locked position, the compressed first biasing member 62 releasably maintains the first lock cam 42 in the locked state. With the first biasing member 62 imparting a sufficient bias force on the first lock cam 42, the first lock cam teeth 46 are urged into interdigitated, meshed relation with the first sidewall teeth 34, thereby providing positive confronting engagement between the respective teeth 46, 34. If the peaks P1 of the first lock cam teeth 46 and the peaks P of the first sidewall teeth 34 initially engage one another in peak-to-peak relation, the bias imparted by the first biasing member 62 urges the first lock cam teeth 46 to become interdigitated with the first sidewall teeth 34, thereby assuring the first cam 42 of the position lock 16 is moved to the desired locked state. At the same time, the second drive member 52 is driven conjointly and concurrently with the lock bolt 38, wherein the retainer wall 66 of the second drive member 52 compresses the second biasing member 64 to impart a bias force with the second biasing member 64 on the abutment surface 72 of the second lock cam 44 to drive and releasably maintain the second lock cam 44 in the locked state. Accordingly, as the second biasing member 64 is compressed, the second lock cam 44 is rotated about the lock bolt axis 40 relative to the lock bolt 38 to the locked state. With the steering column lock arm 12 retained in the locked position, the compressed second biasing member 64 releasably maintains the second lock cam 44 in the locked state. With the second biasing member 64 imparting a sufficient bias force on the second lock cam 44, the second lock cam teeth 48 are urged into interdigitated, meshed relation with the second sidewall teeth 36, thereby providing positive confronting engagement between the respective teeth 48, 36. If the peaks P1 of the second lock cam teeth 48 and the peaks P of the second sidewall teeth 36 initially engage one another, the bias imparted by the second biasing member 64 urges the second lock cam teeth 48 to become interdigitated with the second sidewall teeth 36, thereby assuring the second lock cam 44 of the position lock 16 is moved to the desired locked state.

Figure 8A:
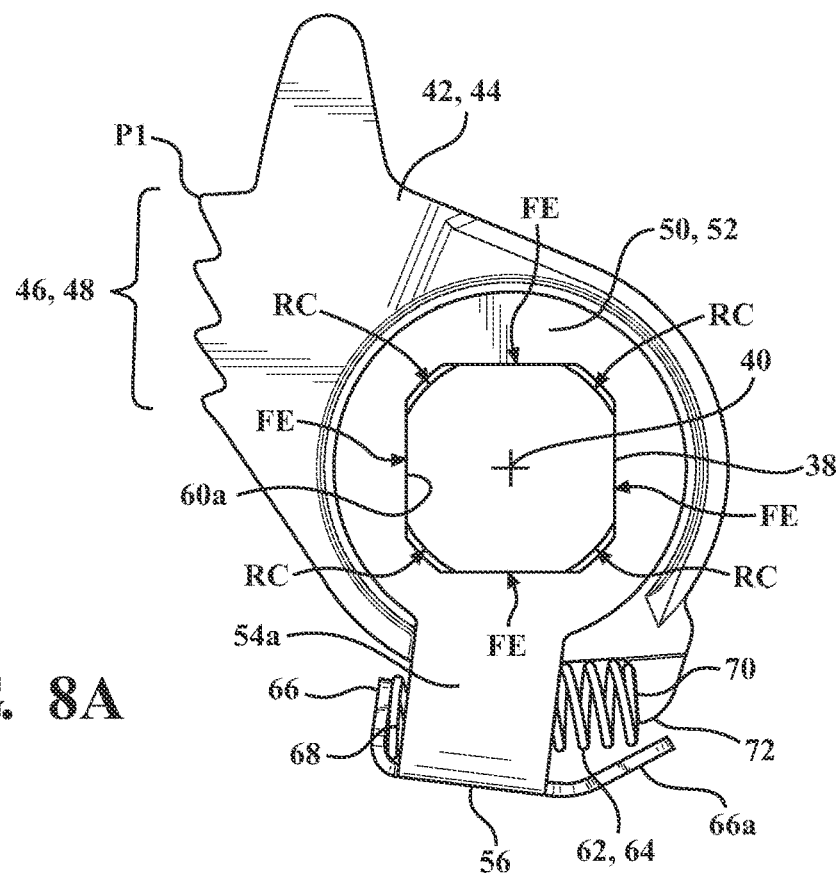
FIG. 8A is a side view of the lock cam and drive member assembly of FIGS. 5-7.
Figure 8B:
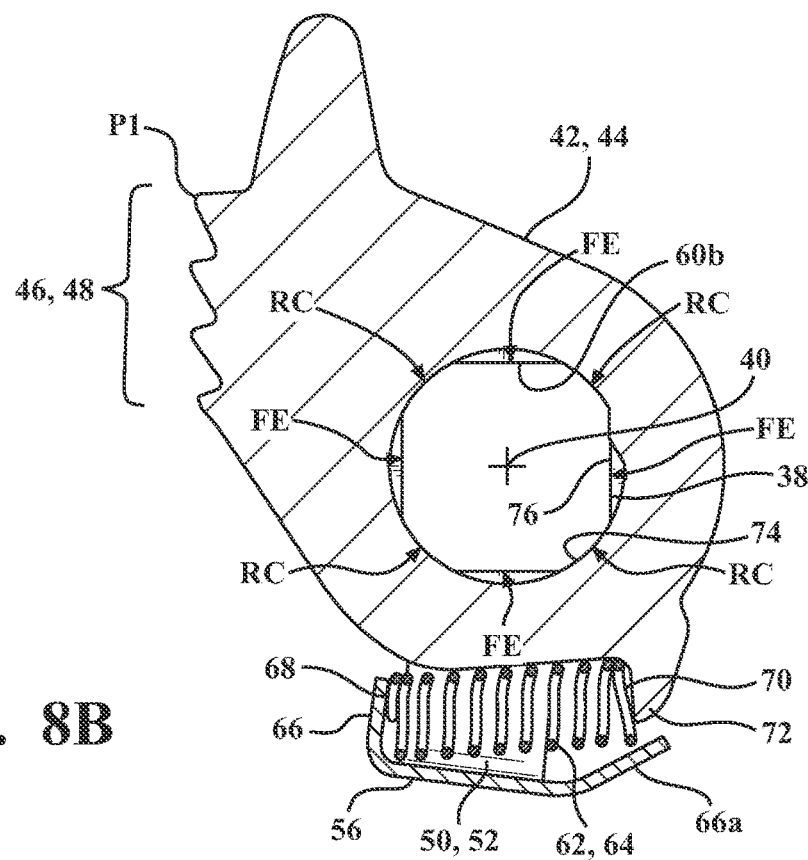
FIG. 8B is a cross-sectional side view taken generally along a plane extending transversely to an axis of rotation of the lock cam and drive member assembly of FIG. 8A.

In further detail yet, during movement of the steering column lock arm 12 from the lock position to the unlock position, the lock bolt 38 imparts a direct bias force on the first lock cam 42 to move the first lock cam 42 to the unlocked state in response to rotation of the lock bolt 38 about the lock bolt axis 40 in the unlock direction to the unlocked position. During movement of the steering column lock arm 12 from the lock position to the unlock position, the lock bolt 38 simultaneously imparts a direct bias force on the second lock cam 44 to move the second lock cam 44 to the unlocked state in response to rotation of the lock bolt 38 about the lock bolt axis 40 in the unlock direction to the unlocked position. To facilitate imparting a direct bias force with the lock bolt 38 on the first and second lock cams 42, 44 during rotation of the lock bolt 38 in an unlock direction of rotation, as best seen in FIGS. 7 and 8B, a through bore 74 of the first and second lock cams 42, 44 has a lug, also referred to as protrusion 76 extending radially inwardly therein for selective engagement with a surface of the lock bolt 38 extending within the through bore 74. The through bore 74 is shown as being generally cylindrical, with the exception of the radially inwardly extending protrusion 76. It is to be understood that the protrusion 76 is not engaged or otherwise driven by the lock bolt 38 when the lock bolt 38 is driven in a lock direction of rotation, as the flat edges FE of the lock bolt 38 adjacent the rounded corners RC remain spaced circumferentially in clearance relation with the protrusion 76, thereby resulting on lost-motion between the lock bolt 38 and the first and second lock cams 42, 44. It is only when the lock bolt 38 is driven in the unlock direction of rotation that flat edges FE adjacent the corner regions CR of the lock bolt 38 engage and drive the protrusions 76, thereby rotating the first and second lock cams 42, 44 from their locked states to their unlocked states.

In accordance with another aspect of the disclosure, a method of preventing inadvertent tilting of a tiltable steering jacket 18 of steering column assembly 10 in opposite tilt directions is provided. The method includes supporting the tiltable steering jacket 18 with a mount bracket 28 having a first sidewall 30 and a second sidewall 32 spaced from the first sidewall 30, with the first sidewall 30 having first positive lock features 34 and the second sidewall having second positive lock features 36. Further, providing a first lock cam 42 on a first side of the tiltable steering jacket 18, with the first lock cam 42 being moveable from an unlocked state, whereat the first lock cam 42 is moved out of blocking engagement with the first positive lock features 34 of the first sidewall 30 to permit tilting movement of the tiltable steering jacket 18 in opposite first and second directions, to a locked state, whereat the first lock cam 42 is moved into blocking engagement with the first positive lock features 34 of the first sidewall 30 to prevent tilting movement in the first direction. Further yet, providing a second lock cam 44 on a second side, opposite the first side, of the tiltable steering jacket 18, with the second lock cam 44 being moveable from an unlocked state, whereat the second lock cam 44 is moved out of blocking engagement with the second positive lock features 36 of the second sidewall 32 to permit tilting movement of the tiltable steering jacket 18 in the opposite first and second directions, to a locked state, whereat the second lock cam 44 is moved into blocking engagement with the second positive lock features 36 of the second sidewall 32 to prevent tilting movement in the second direction.

In accordance with another aspect of the disclosure, the method can further include providing the first and second lock cams 42, 44 being actuatable simultaneously with one another via a single rake lock mechanism.

In accordance with another aspect of the disclosure, the method can further include providing a first drive member 50 and a second drive member 52 fixed to a lock bolt 38 of the single rack lock mechanism for conjoint rotation therewith, with the first drive member 50 being configured to operably drive the first lock cam 42 between the unlocked and locked states in response to rotation of the lock bolt 38 between the unlocked and locked positions, respectively, and with the second drive member 52 being configured to operably drive the second lock cam 44 between the unlocked and locked states in response to rotation of the lock bolt 38 between the unlocked and locked positions, respectively.

In accordance with another aspect of the disclosure, the method can further include providing a first biasing member 62 disposed between the first drive member 50 and the first lock cam 42, and a second biasing member 64 disposed between the second drive member 52 and the second lock cam 44, with the first biasing member 62 being configured to impart a bias force on the first lock cam 42 to move the first lock cam 42 to the locked state in response to rotation of the lock bolt 38 to the locked position, and with the second biasing member 64 being configured to impart a bias force on the second lock cam 44 to move the second lock cam 44 to the locked state in response to rotation of the lock bolt 38 to the locked position.

In accordance with another aspect of the disclosure, the method can further include configuring the lock bolt 38 to impart a bias force on the first lock cam 42 to move the first lock cam 42 to the unlocked state in response to rotation of the lock bolt 38 to the unlocked position and configuring the lock bolt 38 to impart a bias force on the second lock cam 44 to move the second lock cam 44 to the unlocked state in response to rotation of the lock bolt 38 to the unlocked position.

In accordance with another aspect of the disclosure, the method can further include providing the lock bolt 38 for lost motion relative to the first lock cam 42 and the second lock cam 44.

In accordance with another aspect of the disclosure, the method can further include providing the first lock cam 42 and the second lock cam 44 with a radially inwardly extending protrusion 76 configured for engagement with the lock bolt 38 while rotating the lock bolt to the unlocked position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Individual elements or features of a particular embodiment are generally not limited to that particular embodiment, but, where applicable, are interchangeable and can be used in a selected embodiment, even if not specifically shown or described. Accordingly, the invention is not to be seen as limited by the foregoing description.

What is claimed is:

1. A tiltable steering column, comprising:
   a tubular jacket extending along a central axis between a lower end and an upper end, said tubular jacket being pivotal about a jacket pivot axis extending generally transversely to said central axis;
   a mount bracket having a first sidewall and an opposite second sidewall spaced from one another by a cavity sized for movement of a portion of said tubular jacket therebetween, said first sidewall having a plurality of first positive lock features and said second sidewall having a plurality of second positive lock features;
   a lock bolt extending along a lock bolt axis, said lock bolt axis extending transversely to said central axis; and
   a first lock cam and a second lock cam operably supported by said lock bolt for rotation about said lock bolt axis between a locked state, in response to selective rotation of said lock bolt about said lock bolt axis to a locked position, and an unlocked state, in response to selective rotation of said lock bolt about said lock bolt axis to an unlocked position, said first lock cam having at least one first lock cam positive lock feature, said second lock cam having at least one second lock cam positive lock feature, said at least one first lock cam positive lock feature being configured for obstructing engagement with said first positive lock features of said first sidewall when said first lock cam is in the locked state to releasably lock said tubular jacket against pivotal movement about said jacket pivot axis upwardly or downwardly in a first direction, and said at least one second lock cam positive lock feature being configured for obstructing engagement with said second positive lock features of said second sidewall when said second lock cam is in the locked state to releasably lock said tubular jacket against pivotal movement about said jacket pivot axis upwardly or downwardly in a second direction opposite said first direction, such that said first lock cam and said second lock cam simultaneously cooperate to releasably lock said tubular jacket against pivotal movement about said jacket pivot axis upwardly and downwardly in opposite first and second directions.

2. The tiltable steering column of claim 1, further including a first drive member and a second drive member fixed to said lock bolt for conjoint rotation therewith, said first drive member is configured to operably drive said first lock cam between the unlocked and locked states in response to rotation of said lock bolt about said lock bolt axis between the unlocked and locked positions, respectively, and said second drive member is configured to operably drive said second lock cam between the unlocked and locked states in response to rotation of said lock bolt about said lock bolt axis between the unlocked and locked positions, respectively, wherein said first lock cam and said second lock cam are configured to be simultaneously driven from the unlocked state to the locked state in response to rotation of said lock bolt about said lock bolt axis in the lock direction to the locked position, and wherein said first lock cam and said second lock cam are configured to be simultaneously driven from the locked state to the unlocked state in response to rotation of said lock bolt about said lock bolt axis in the unlock direction to the unlocked position.

3. The tiltable steering column of claim 2, further including a first biasing member disposed between said first drive member and said first lock cam, and a second biasing member disposed between said second drive member and said second lock cam, said first biasing member imparts a bias force on said first lock cam to move said first lock cam to the locked state in response to rotation of said lock bolt about said lock bolt axis in the lock direction to the locked position, and said second biasing member imparts a bias force on said second lock cam to move said second lock cam to the locked state in response to rotation of said lock bolt about said lock bolt axis in the lock direction to the locked position.

4. The tiltable steering column of claim 3, wherein said first biasing member and said second biasing member are spring members.

5. The tiltable steering column of claim 3, wherein said lock bolt imparts a bias force on said first lock cam to move said first lock cam to the unlocked state in response to rotation of said lock bolt about said lock bolt axis in the unlock direction to the unlocked position and said lock bolt imparts a bias force on said second lock cam to move said second lock cam to the unlocked state in response to rotation of said lock bolt about said lock bolt axis in the unlock direction to the unlocked position.

6. The tiltable steering column of claim 3, wherein said first drive member compresses said first biasing member to impart a bias force with said first biasing member on said first lock cam to releasably maintain said first lock cam in the locked state, and wherein said second drive member compresses said second biasing member to impart a bias force with said second biasing member on said second lock cam to releasably maintain said second lock cam in the locked state.

7. The tiltable steering column of claim 1, wherein said at least one first lock cam positive lock feature includes a plurality of first lock cam teeth and said at least one second lock cam positive lock feature includes a plurality of second lock cam teeth.

8. The tiltable steering column of claim 7, wherein said first positive lock features include a plurality of first positive lock teeth and said second positive lock features include a plurality of second positive lock teeth, said first positive lock teeth being in locked interdigitated engagement with said first lock cam teeth when said first lock cam is in the locked state, and said second positive lock teeth being in locked interdigitated engagement with said second lock cam teeth when said second lock cam is in the locked state.

9. The tiltable steering column of claim 7, wherein said first sidewall and said second sidewall each have inner surfaces facing inwardly toward one another toward said cavity and outer surfaces facing outwardly away from one another away from said cavity, said plurality of first positive lock teeth extending outwardly from said outer surface of said first sidewall and said plurality of second lock cam teeth extending outwardly from said outer surface of said second sidewall.

10. The tiltable steering column of claim 1, wherein said first lock cam and said second lock cam are rotatable about said lock bolt axis relative to said lock bolt.

11. The tiltable steering column of claim 10, further including a first biasing member that imparts a bias force on said first lock cam to move said first lock cam to the locked state in response to rotation of said lock bolt about said lock bolt axis in the lock direction to the locked position, and a second biasing member that imparts a bias force on said second lock cam to move said second lock cam to the locked state in response to rotation of said lock bolt about said lock bolt axis in the lock direction to the locked position.

12. The tiltable steering column of claim 11, wherein said lock bolt imparts a bias force on said first lock cam to move said first lock cam to the unlocked state in response to rotation of said lock bolt about said lock bolt axis in the unlock direction to the unlocked position, and said lock bolt imparts a bias force on said second lock cam to move said second lock cam to the unlocked state in response to rotation of said lock bolt about said lock bolt axis in the unlock direction to the unlocked position.

13. The tiltable steering column of claim 1, wherein said first sidewall and said second sidewall of said mount bracket each have through openings, said lock bolt extending along said lock bolt axis through said through openings for movement therein to allow said tubular jacket to be pivoted about said jacket pivot axis.

14. A dual direction lock to inhibit pivot movement of a first member relative to a second member, comprising:
a mount bracket having a first sidewall and an opposite second sidewall, said first sidewall having at least one first lock feature and said second sidewall having at least one second lock feature;
a lock bolt extending along a lock bolt axis; and
a first lock cam and a second lock cam operably supported by said lock bolt for rotation about said lock bolt axis between a locked state, in response to selective rotation of said lock bolt about said lock bolt axis to a locked position, and an unlocked state, in response to selective rotation of said lock bolt about said lock bolt axis to an unlocked position, said first lock cam having at least one first lock cam lock feature, said second lock cam having at least one second lock cam lock feature, said at least one first lock cam lock feature being configured for engagement with said first lock features of said first sidewall when said first lock cam is in the locked state, and said at least one second lock cam lock feature being configured for engagement with said second lock features of said second sidewall when said second lock cam is in the locked state, wherein said first lock cam releasably locks the first member and the second member against pivotal movement relative to one another in an upward first direction when said first lock cam is in the locked state, and said second lock cam releasably locks the first member and the second member against pivotal movement relative to one another in a second downward direction when said second cam is in the locked state.

15. The dual direction lock of claim 14, wherein the first member is a steering column jacket and the second member is a vehicle body member.

16. A method of preventing inadvertent tilting of a tiltable steering jacket of steering column in opposite tilt directions, comprising:
supporting the tiltable steering jacket with a mount bracket having a first sidewall and a second sidewall spaced from the first sidewall, with the first sidewall having first positive lock features and the second sidewall having second positive lock features;
providing a first lock cam on a first side of the tiltable steering jacket, with the first lock cam being moveable from an unlocked state, whereat the first lock cam is moved out of blocking engagement with the first positive lock features of the first sidewall to permit tilting movement of the tiltable steering jacket in opposite first and second directions, to a locked state, whereat the first lock cam is moved into blocking engagement with the first positive lock features of the first sidewall to prevent tilting movement in the first direction; and
providing a second lock cam on a second side, opposite the first side, of the tiltable steering jacket, with the second lock cam being moveable from an unlocked state, whereat the second lock cam is moved out of blocking engagement with the second positive lock features of the second sidewall to permit tilting movement of the tiltable steering jacket in the opposite first and second directions, to a locked state, whereat the second lock cam is moved into blocking engagement with the second positive lock features of the second sidewall to prevent tilting movement in the second direction.

17. The method of claim 16, further including providing the first and second lock cams being actuatable simultaneously with one another via a single rake lock mechanism.

18. The method of claim 16, further including providing a first drive member and a second drive member fixed to a lock bolt of the single rack lock mechanism for conjoint rotation therewith, with the first drive member being configured to operably drive the first lock cam between the unlocked and locked states in response to rotation of the lock bolt between the unlocked and locked positions, respectively, and with the second drive member being configured to operably drive the second lock cam between the unlocked and locked states in response to rotation of the lock bolt between the unlocked and locked positions, respectively.

19. The method of claim 18, further including providing a first biasing member disposed between the first drive member and the first lock cam, and a second biasing member disposed between the second drive member and the second lock cam, with the first biasing member being configured to impart a bias force on the first lock cam to move the first lock cam to the locked state in response to rotation of the lock bolt to the locked position, and with the second biasing member being configured to impart a bias force on the second lock cam to move the second lock cam to the locked state in response to rotation of said lock bolt to the locked position.

20. The method of claim 19, further including configuring the lock bolt to impart a bias force on the first lock cam to move the first lock cam to the unlocked state in response to rotation of the lock bolt to the unlocked position and configuring the lock bolt to impart a bias force on the second lock cam to move the second lock cam to the unlocked state in response to rotation of said lock bolt to the unlocked position.

\* \* \* \* \*